(12) United States Patent
Matsubara et al.

(10) Patent No.: US 6,267,576 B1
(45) Date of Patent: Jul. 31, 2001

(54) MOLD ASSEMBLY FOR MAKING MULTILAYER MOLDED ARTICLE

(75) Inventors: Shigeyoshi Matsubara, Osaka; Yoshinori Ohmura, Takatsuki; Kohji Yamatsuta, Otsu, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/383,016

(22) Filed: Aug. 25, 1999

Related U.S. Application Data

(62) Division of application No. 08/915,928, filed on Aug. 21, 1997, now Pat. No. 5,980,805.

(51) Int. Cl.$^7$ .................................................. B29C 45/16
(52) U.S. Cl. ........................ 425/112; 425/145; 425/566; 425/573; 425/577; 425/130
(58) Field of Search ...................... 425/130, 145, 425/146, 562, 564, 566, 572, 573, 577, 134, 112; 264/154, 328.7, 328.8, 255

(56) References Cited

U.S. PATENT DOCUMENTS

| | | |
|---|---|---|
| 3,809,733 | 5/1974 | Sandiford et al. . |
| 4,076,788 | 2/1978 | Ditto . |
| 4,783,298 | 11/1988 | Oda . |
| 5,282,732 | * 2/1994 | Eggert .............................. 425/153 |

FOREIGN PATENT DOCUMENTS

| | | |
|---|---|---|
| 195 08 509 | 9/1996 | (DE) . |
| 0 625 418 | 11/1994 | (EP) . |

* cited by examiner

*Primary Examiner*—James P. Mackey
*Assistant Examiner*—Donald Heckenberg
(74) *Attorney, Agent, or Firm*—Fitch, Even, Tabin & Flannery

(57) ABSTRACT

A mold assembly for making a multilayer molded article comprising: a first mold; a second mold; a shut-off pin slidably received in a resin-supplying gate opened to a cavity face of the first mold; a pin-driving unit for moving the shut-off pin among an opening position, a closing position and a projecting position; a resin-supplying unit for supplying a molten thermoplastic resin from said resin-supplying gate; and a press unit for moving the molds between an open position and a closed position.

13 Claims, 13 Drawing Sheets

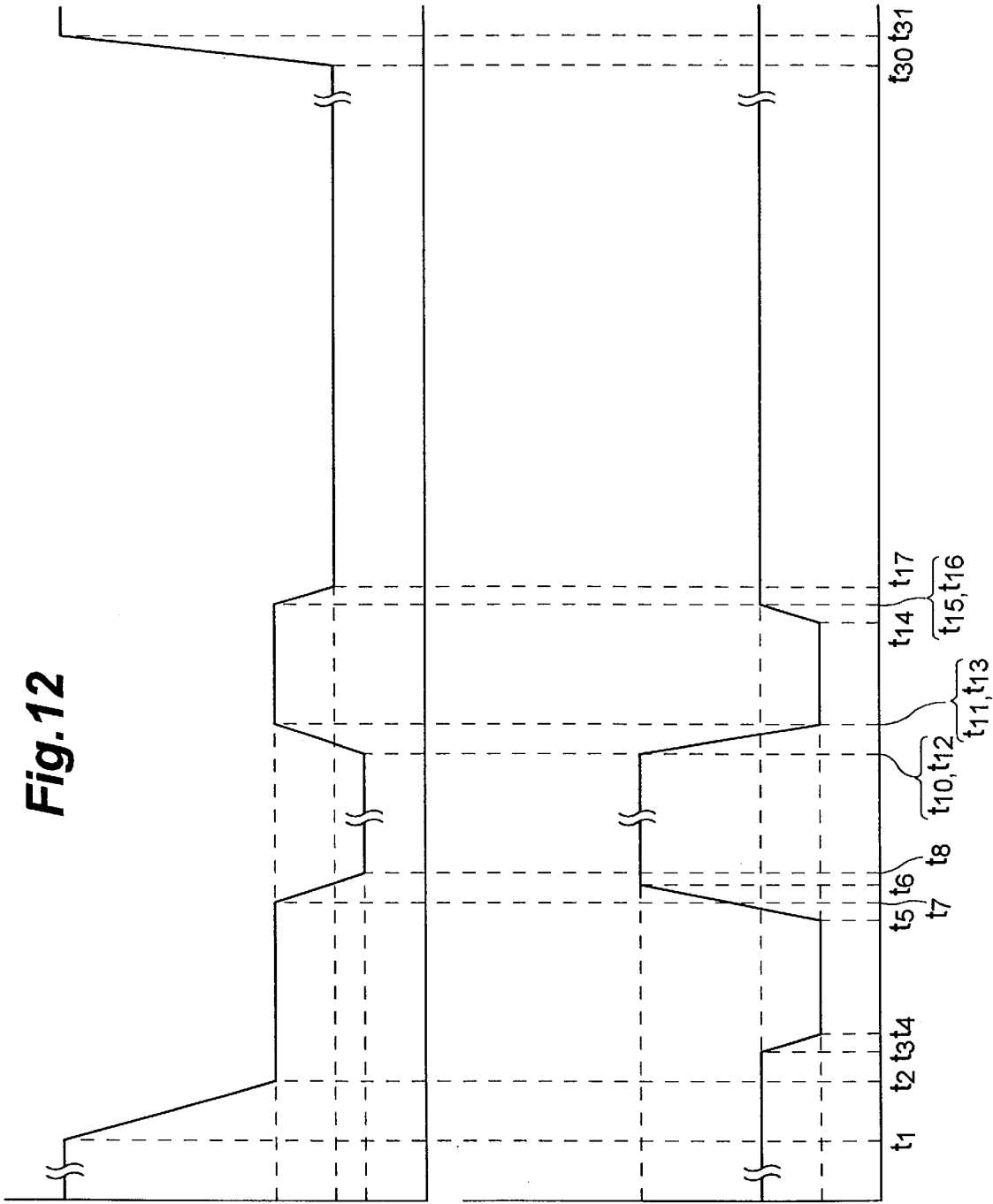

MOLD ASSEMBLY FOR MAKING MULTILAYER MOLDED ARTICLE

This application is a divisional of Ser. No. 08/915,928 filed Aug. 21, 1997, now U.S. Pat. No. 5,980,805.

BACKGROUND OF THE INVENTION

1. Field of the Invention

The present invention relates to a mold assembly suitable for making a multilayer molded article and a method of making the multilayer molded article using the same.

2. Related Background Art

Methods for making a thermoplastic resin molded article having protrusions such as ribs and bosses on its rear face by means of injection molding technique, injection compression molding technique, or the like have conventionally been well-known. In the thermoplastic resin molded article manufactured by such a method, a sink is likely to occur at a position on its base material surface corresponding to a protrusion, thereby making it difficult to yield a smooth surface.

Known as means for overcoming such a problem is a molding method using a foaming agent. In this method, however, it is difficult to control the state of foaming. Also, even in this method, a molded article having a smooth surface without sinks is hard to obtain. Further, the foaming agent is expensive in general, and its thermal stability upon heating may not be sufficient.

Known as another means is a method in which, from the viewpoint of form, the thickness of a protrusion such as rib or boss is made smaller than that of the base material in contact therewith, thereby preventing sinks from occurring. In this method, however, the form may lack adaptability. Also, since its strength decreases, the thickness of the base material surface has to be increased in order to maintain the strength. Therefore, this method is greatly restricted in terms of form and is hard to respond to the recent tendency of the molded article toward lighter weight and smaller thickness.

SUMMARY OF THE INVENTION

It is an object of the present invention to provide a mold assembly which can easily and efficiently make, in a series of steps without any restriction in terms of material and form, a molded article with a favorable appearance having no sinks generated on a surface of its base material opposite to a part where a protrusion such as rib or boss is attached.

It is another object of the present invention to provide a method of making a molded article, which enables making, efficiently and securely in a series of steps without any restriction in terms of material and form, of the molded article with a favorable appearance having no sinks generated on a surface of its base material opposite to a part where a protrusion such as rib or boss is attached.

The mold assembly for making a multilayer molded article in accordance with the present invention comprises:

a first mold having a cavity face, a resin-supplying gate open to the cavity face, and a resin passage communicating with the resin-supplying gate;

a second mold having a cavity face opposing the cavity face of the first mold;

a shut-off pin slidably received in the resin-supplying gate;

a pin-driving unit for moving the shut-off pin among an opening position where the shut-off pin is completely received in the first mold while the resin-supplying gate is maintained in an opening state, a closing position where the shut-off pin is completely received in the first mold while the resin-supplying gate is maintained in a closing state, and a projecting position where a part of the shut-off pin projects from the cavity face of the first mold while the resin-supplying gate is maintained in the closing state;

a resin-supplying unit for supplying a molten thermoplastic resin from the resin-supplying gate by way of the resin passage; and a press unit, connected to the first and second molds, for moving at least one of these molds between an open position where the first and second molds are in an open state and a closed position where these molds are in a closed state.

In the above-mentioned mold assembly of the present invention, the shut-off pin can be projected from the cavity face of the first mold while the resin-supplying gate is maintained in the closing state. Accordingly, the first and second molds are closed so as to mold a resin in a state where the shut-off pin is thus projected. Thereafter, when the shut-off pin is returned into the first mold, a hole communicating with the resin-supplying gate is formed in the resulting resin molded article (first molded layer). Consequently, after the first and second molds are subsequently brought into an open state, a molten thermoplastic resin can be supplied between the first molded layer and the cavity face of the second mold by way of the hole in the first molded layer, whereby a multilayer molded article in which the front surface of the first molded layer (surface on the second mold side) is covered with another resin molded article (second molded layer) can be obtained. When a protrusion such as rib or boss is formed on the rear surface (surface on the first mold side) of the resulting multilayer molded article, though a sink may occur on the front surface of the first molded layer due to the protrusion, this surface is covered with the second molded layer as mentioned above. Accordingly, the front surface of the resulting multilayer molded article attains a favorable appearance without sinks. Also, since the molten thermoplastic resin for forming the second molded layer is supplied through the hole in the first molded layer, no irregularities occur on the front surface of the multilayer molded article due to the resin supplied.

Thus, the mold assembly of the present invention can easily and efficiently make, in a series of steps without any restriction in terms of material and form, a multilayer molded article with a favorable appearance having no sinks generated on a surface of its base material opposite to a part where a protrusion such as rib or boss is attached.

In the mold assembly of the present invention, the pin-driving unit may move the shut-off pin among the opening position, the closing position, and a plurality of projecting positions in which the projecting part of the shut-off pin projected from the cavity face of the first mold has respective lengths different from each other. When the projecting position of the shut-off pin is thus controllable in a plurality of steps, the projecting position of the shut-off pin can be adjusted in response to the thickness of the resin molded layer to be obtained. Accordingly, as will be explained later, a multilayer molded article comprising three or more layers can be obtained efficiently and securely.

Preferably, the mold assembly of the present invention further comprises a control unit, electrically connected to the pin-driving unit and the press unit, for controlling these units such that:

(a) while the resin-supplying gate is brought into the opening state by means of the shut-off pin, a molten thermoplastic resin is supplied, by way of the resin-supplying gate, between the cavity faces of the first and second molds that are in the open state;

(b) while the resin-supplying gate is brought into the closing state by means of the shut-off pin, a part of the shut-off pin is projected from the cavity face of the first mold;

(c) the first and second molds are closed so as to attain the closed state, thereby shaping the resin, and thus shaped resin is cooled so as to be solidified;

(d) the first and second molds are opened so as to attain the open state;

(e) the shut-off pin is returned into the first mold, so as to form a hole in the resin solidified in (c) and bring the resin-supplying gate into the opening state, and a molten thermoplastic resin is supplied between the resin solidified in (c) and the cavity face of the second mold by way of the resin-supplying gate and the hole;

(f) the resin-supplying gate is brought into the closing state by means of the shut-off pin;

(g) the first and second molds are closed so as to attain the closed state, thereby shaping the resin, and thus shaped resin is cooled so as to be solidified; and (h) the first and second molds are opened.

When such a control unit is provided, the method of making a multilayer molded article in accordance with the present invention, which will be explained in the following, can be performed efficiently and securely.

The method of making a multilayer molded article in accordance with the present invention comprises:

(a) step of, by means of a shut-off pin slidably received in a resin-supplying gate open to a cavity face of a first mold, bringing the resin-supplying gate into an opening state, and supplying, by way of the resin-supplying gate, a molten thermoplastic resin between the cavity face of the first mold and a cavity face of a second mold which are in an open state;

(b) step of bringing the resin-supplying gate into a closing state by means of the shut-off pin and projecting a part of the shut-off pin from the cavity face of the first mold;

(c) step of closing the first and second molds so as to attain a closed state, thereby shaping the resin, and cooling thus shaped resin so as to be solidified;

(d) step of opening the first and second molds so as to be placed in the open state;

(e) step of returning the shut-off pin into the first mold, thereby forming a hole in the resin solidified in the step (c) and bringing the resin-supplying gate into the opening state, and supplying a molten thermoplastic resin between the resin solidified in the step (c) and the cavity face of the second mold by way of the resin-supplying gate and the hole;

(f) step of bringing the resin-supplying gate into the closing state by means of the shut-off pin;

(g) closing the first and second molds so as to attain the closed state, thereby shaping the resin, and cooling thus shaped resin so as to be solidified; and (h) opening the first and second molds so as to remove the multilayer molded article therefrom.

In the above-mentioned method of making the multilayer molded article in accordance with the present invention, while the resin-supplying gate is maintained in the closing state and the shut-off pin is projected from the cavity face of the first mold, the first and second molds are closed so as to mold a resin. Accordingly, when the shut-off pin is returned into the first mold thereafter, a hole communicating with the resin-supplying gate is formed in the resulting resin molded article (first molded layer). Consequently, after the first and second molds are subsequently brought into an open state, a molten thermoplastic resin can be supplied between the first molded layer and the cavity face of the second mold by way of the hole in the first molded layer, whereby a multilayer molded article in which the front surface of the first molded layer (surface on the second mold side) is covered with another resin molded article (second molded layer) can be obtained. When a protrusion such as rib or boss is formed on the rear surface (surface on the first mold side) of the resulting multilayer molded article, though a sink may occur on the front surface of the first molded layer due to the protrusion, this surface is covered with the second molded layer as mentioned above. Accordingly, the front surface of the resulting multilayer molded article attains a favorable appearance without sinks. Also, since the molten thermoplastic resin for forming the second molded layer is supplied through the hole in the first molded layer, no irregularities occur on the front surface of the multilayer molded article due to the resin supplied.

Thus, the method of making a multilayer molded article in accordance with the present invention enables making, easily and efficiently in a series of steps without any restriction in terms of material and form, a multilayer molded article with a favorable appearance having no sinks generated on a surface of its base material opposite to a part where a protrusion such as rib or boss is attached.

In the case where the multilayer molded article obtained by the method of the present invention includes first and second molded layers, a first amount of molten thermoplastic resin necessary for forming the first molded layer is supplied between the cavity faces of the first and second molds by way of the resin-supplying gate in the step (a), and a second amount of molten thermoplastic resin necessary for forming the second molded layer is supplied between the first molded layer and the cavity face of the second mold by way of the resin-supplying gate and the hole in the first molded layer in the step (e).

Preferably, the length of the projecting part of the shut-off pin projected from the cavity face of the first mold in the step (b) is not greater than a cavity clearance between the cavity faces of the first and second molds brought into the closed state in the step (c). Preferably, the shut-off pin keeping the resin-supplying gate in the closing state is completely received in the first mold in the step (f).

In the method of making the multilayer molded article in accordance with the present invention, the steps (b) to (e) may be repeated a plurality of times. In this case, a multilayer molded article comprising three or more resin molded layers can be obtained efficiently and securely.

In the method of making the multilayer molded article in accordance with the present invention, the operation for closing the first and second molds in the step (c) may be effected while the operation for projecting the shut-off pin in the step (b) is being performed. Also, the operation for returning the shutoff pin into the first mold in the step (e) may be effected while the operation for opening the first and second molds in the step (d) is being performed.

Further, the operation for returning the shut-off pin into the first mold in the step (e) may be effected prior to the step (d), and the operation for opening the first and second molds in the step (d) may be effected by means of the pressure of the molten thermoplastic resin supplied between the resin solidified in the step (c) and the cavity face of the second mold. Preferably, in this case, the operation for returning the shut-off pin into the first mold in the step (e) is effected while or after the closing pressure applied between the first and second molds is substantially shifted to a no-load state.

In the method of the present invention, the material (thermoplastic resin) usable therein is not restricted in particular, and a plurality of thermoplastic resins may be used. Namely, the multilayer molded article obtained by the method of the present invention may include a first molded layer made of a first thermoplastic resin and a second molded layer made of a second thermoplastic resin. In this case, the first molten thermoplastic resin is supplied between the cavity faces of the first and second molds that are placed in the open state by way of the resin-supplying gate in the step (a), and the second molten thermoplastic resin is supplied between the first molded layer and the cavity face of the second mold by way of the resin-supplying gate and the hole in the first molded layer in the step (e). When a plurality of thermoplastic resins are thus used, a multilayer molded article in which the base resin layer (first molded layer) and the surface resin layer (second molded layer) are different from each other (with at least one intermediate layer different therefrom in the case of a molded article comprising three or more resin molded layers) can be made easily and efficiently. When the resins constituting the respective layers are thus appropriately selected, the design of the multilayer molded article can easily be changed. Also, it becomes easy to provide the molded article with a vibration-isolating property or its surface with a soft feel.

Here, the above-mentioned "open state" is defined as a state wherein the cavity clearance between the cavity face of the first mold and the cavity face of the second mold is larger than the thickness of a desired product (multilayer molded article). In the method of the present invention, the open state preferably includes a first open state wherein the first and second molds are arranged with a cavity clearance therebetween such that the molded article can be removed from between the molds, and a second open state wherein the cavity clearance is smaller than that in the first open state. Preferably, the operation for supplying the molten thermoplastic resin in the step (a) is effected after the first and second molds are shifted from the first open state to the second open state.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 12 is a timing chart showing operations of the second mold and shut-off pin in another embodiment of the method of making a multilayer molded article in accordance with the present invention;

DESCRIPTION OF THE PREFERRED EMBODIMENTS

Figure 1:
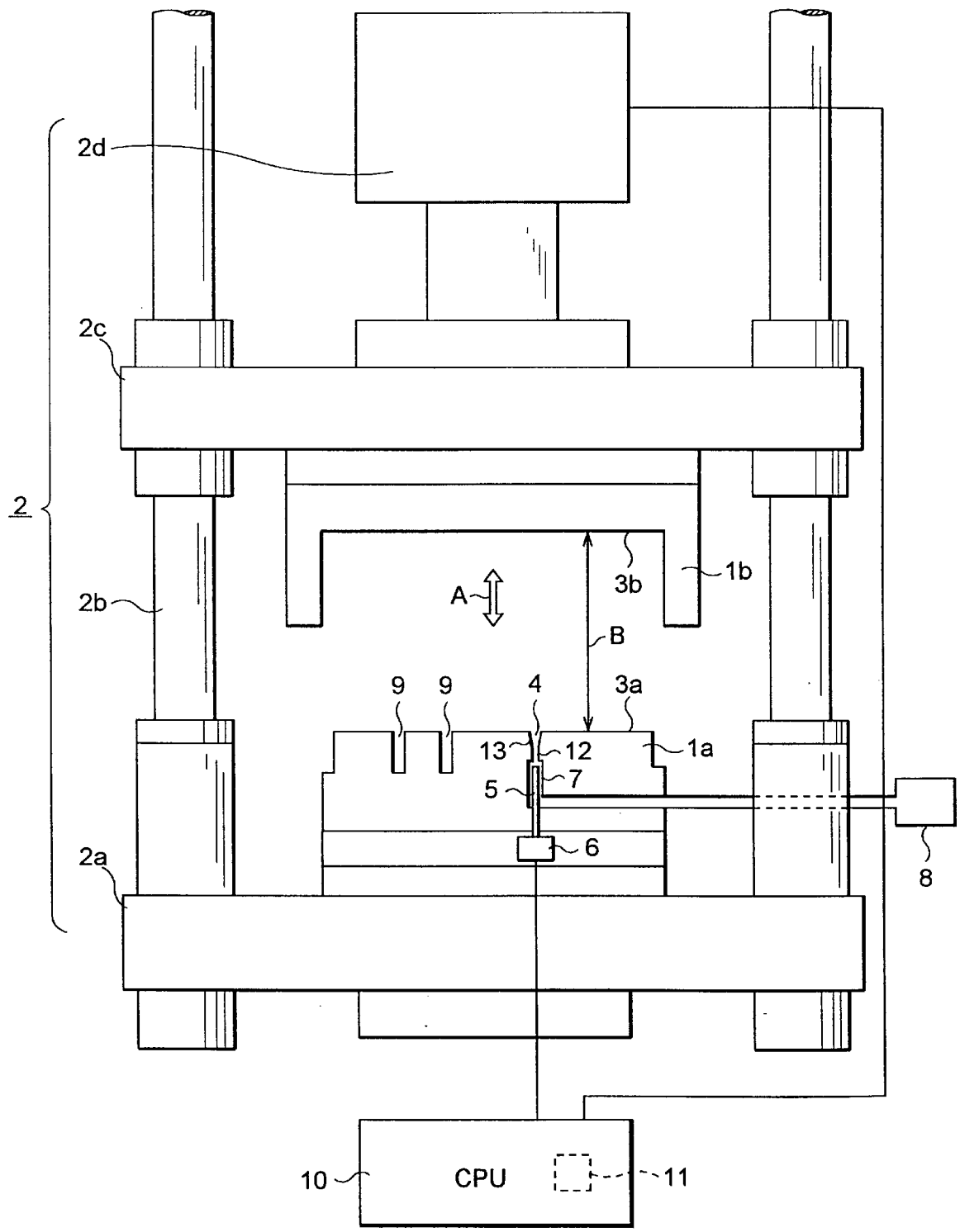
FIG. 1 is a schematic sectional view showing an embodiment of the mold assembly for making a multilayer molded article in accordance the present invention.

In the following, preferred embodiments of the present invention will be explained in detail with reference to the accompanying drawings. In the drawings, parts identical or equivalent to each other will be referred to with marks identical to each other.

First, the mold assembly for making a multilayer molded article in accordance with the present invention will be explained.

As shown in FIG. 1, the mold assembly of the present invention is constituted by a first mold (1a) and a second mold (1b), each of which is fixed to a press unit (2). Referring to FIG. 1, the first mold (1a: fixed mold) is secured to a fixed frame (2a) of the press unit (2). The second mold (1b: movable mold) is secured to a movable frame (2c) which is connected to the fixed frame (2a) through a connecting rod (2b). A driving unit (2d) of the second mold (1b) is connected to the movable frame (2c), so that the second mold (1b) can be moved in directions A (indicated by double-ended arrow A). The driving unit (2d) of the second mold (1b) is not particularly limited. For example, a hydraulic driving unit is used.

The first mold (1a) and the second mold (1b) respectively have cavity faces (3a, 3b) opposing each other and corresponding to the shape of a desired product. When the first mold (1a) and the second mold (1b) are closed, the cavity faces (3a, 3b) define a cavity space substantially coinciding with the outer shape of the desired multilayer molded article.

The second mold (1b) can be moved, by the press unit (2), among (i) a first open position where a cavity clearance (B in FIG. 1) between the cavity face (3a) of the first mold and the cavity face (3b) of the second mold is maintained in a state (first open state) wherein the molded article between the first and second molds (1a, 1b) can be removed; (ii) a second open position where the cavity clearance is maintained in a state (second open state) to be smaller than that in the first open state; and (iii) a closed position where the cavity clearance is maintained in a state (closed state) to substantially match the thickness of the desired molded article. The first and second molds (1a, 1b) can be maintained at a predetermined closing pressure by the press unit (2). Here, the first and second molds (1a, 1b) shown in FIG. 1 are in the first open state.

The first mold (1a) shown in FIG. 1 is a so-called male mold whose cavity face (3a) is formed as a projecting portion, whereas the second mold (1b) is a so-called female mold whose cavity face (3b) is formed as a recessed portion. Nevertheless, the first and second molds may be female and male molds, respectively. In addition, the first and second molds may be movable and fixed molds, respectively, or both of the molds may be movable molds. Furthermore, the first and second molds may be upper and lower molds, respectively.

The cavity face (3a) of the first mold (1a) has at least one resin-supplying gate (4) for supplying a molten thermoplastic resin into the cavity. A shut-off pin (5: gate opening/closing pin) is received in the resin supplying gate (4) so as to be able to slide (advance and retract). A pin-driving unit (6) is connected to the shut-off pin (5), whereby the shut-off pin (5) and the pin-driving unit (6) constitute a passage opening/closing mechanism. One end of a resin passage (7: molten resin passage) formed in the first mold (1a) is connected to the resin-supplying gate (4), whereas a resin-supplying unit (8) is connected to the other end of the resin passage (7). The pin-driving unit (6) is not restricted in particular. For example, various kinds of units such as hydraulic units, pneumatic units, and electric units using a motor or the like can be used therefor.

Figure 2:
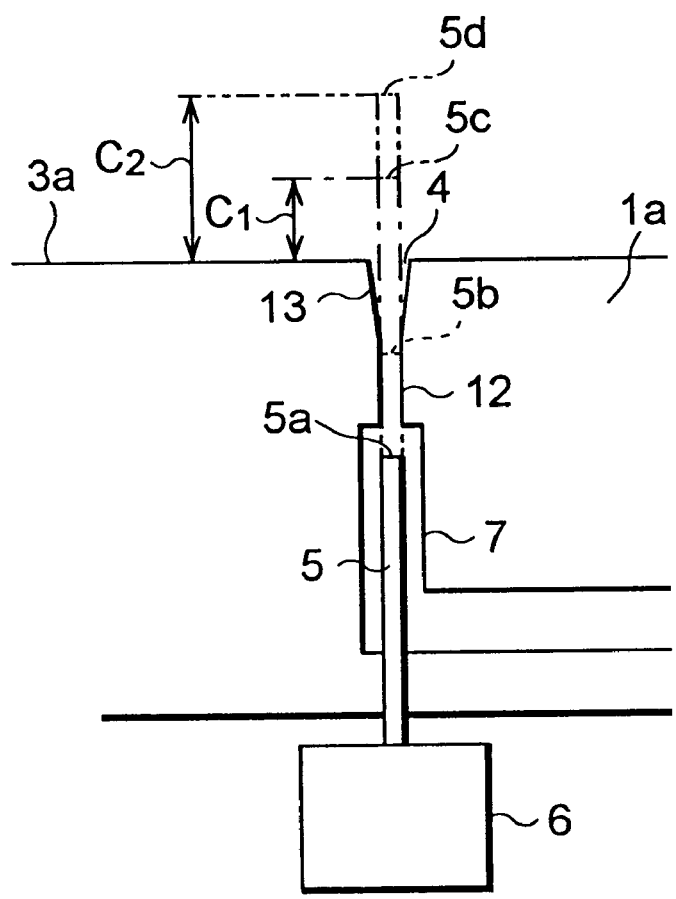
FIG. 2 is a schematic sectional view of the mold assembly shown in FIG. 1 near its resin-supplying gate.

In the mold assembly of the present invention, as shown in FIG. 2, the shut-off pin (5) is driven by the pin-driving unit (6) so as to be movable among an opening position (5a) where the shut-off pin (5) is completely received in the first mold (1a) while the resin-supplying gate (4) is maintained in an opening state; a closing position (5b) where the shut-off pin (5) is completely received in the first mold (1a) while the resin-supplying gate (4) is maintained in a closing state; and projecting positions (5c, 5d) where a part of the shut-off pin (5) projects from the cavity face (3a) of the first mold (1a) while the resin-supplying gate (4) is maintained in the closing state. Here, the shut-off pin (5) shown in FIG. 2 can be stopped at the first and second projecting positions (5c, 5d) in which the projecting part of the shut-off pin has respective lengths ($C_1$ and $C_2$ in FIG. 2) different from each other.

The cavity face (3a) of the first mold (1a) has recessed portions (9) for forming protrusions such as rib and boss on the rear surface of the resulting multilayer molded article.

A control unit (10: CPU) is electrically connected to the pin-driving unit (6) and the driving unit (2d) of the press unit (2) so as to control these units, whereby the pin-driving unit (6) and the control unit (10) constitute pin movement control means. In the mold assembly of the present invention, as will be explained later, operations of the driving unit (2d) of the press unit (2) and pin-driving unit (6), closing pressures of the first and second molds (1a, 1b), and the like are controlled by the control unit (10). The period of time during which the resin-supplying gate (4) is kept open (period of time during which the shutoff pin (5) is maintained at the opening position (5a)), the period of time before the second mold (1b) is set to the closed position after the shut-off pin (5) is placed at the projecting position (5c, 5d) or closing position (5b), the period of time before the shut-off pin (5) is placed at the opening position (5a) after the second mold (1b) is placed at the second open position, and the like are controlled by a timer (11) within the control unit (10).

In the following, the passage opening/closing mechanism in the mold assembly of the present invention will be explained in detail.

In the mold assembly shown in FIGS. 1 and 2, the resin passage (7) is open to the cavity face (3a) through a capillary (12), known as a sprue, having a cross section smaller than that of the resin passage (7). The resin-supplying gate (4) is constituted by the sprue (12) and the passage between the sprue (12) and the cavity face (3a). The shut-off pin (5) is linearly movable in its longitudinal direction within the resin passage (7) and resin-supplying gate (4) so as to freely advance and retract, while having such a thickness that, when moving within the sprue (12), the outer peripheral surface of the shut-off pin (5) tightly slides against the inner periphery of the sprue (12).

Consequently, in the case where the tip portion of the shut-off pin (5) is within the resin passage (7), whereby the resin passage (7) and the sprue (12) communicate with each other, the molten resin can be supplied into the cavity by way of the sprue (12). By contrast, in the case where the tip portion of the shut-off pin (5) is within the sprue (12), whereby the sprue (12) is closed by the shut-off pin (5), the 21 molten resin cannot be supplied into the cavity since the resin passage (7) is blocked by the sprue (12). Thus, the resin-supplying gate (4) can be opened and closed in accordance with the state of movement of the shut-off pin (5) in the sprue (12).

The passage opening/closing mechanism in the present invention refers to a mechanism for effecting an operation for opening/closing the resin-supplying gate (4) by moving the shut-off pin (5) in such a sprue (12).

Such a mechanism itself is similar to the known opening/closing mechanisms for resin passages by means of shut-off pins. Accordingly, the form of the shutoff pin (5), the structure, form, and length of the sprue (12), and the like are not different in particular from those conventionally known. For example, the shut-off pin (5) may have any cross-sectional form of circle, ellipse, square, rectangle, hexagon, and the like; whereas its tip portion may have any form of plane, cone, pyramid, sphere, and the like. In general, a pin of rod type having a circular cross section and a planar or conical tip end is often used, whereas the form and size of the cross section of the sprue (12) are determined, depending on the form and size of the shut-off pin (5) used, such that the pin can tightly slide within the sprue.

The sprue (12) may be configured such that its part extending from the portion connected to the resin passage (7) to the portion open to the cavity face (3a) is uniformly constituted while the shut-off pin (5) can tightly slide against the whole length of this part. Alternatively, as shown in FIG. 2, a taper (13) may be formed at a portion between the sprue (12) and the cavity face (3a). When the resin-supplying gate (4) is formed like a funnel as in the latter case, it is advantageous in that the finally shaped multilayer molded article can easily be released from the molds.

As mentioned above, the shut-off pin (5) is linearly movable in its longitudinal direction within the resin passage (7) and resin-supplying gate (4) so as to freely advance and retract, whereas the rear end portion of the pin (5) is connected to the pin movement control means (pin-driving unit (6) and control unit (10)). In the conventional pin movement control means, since the shut-off pin was aimed for simply opening/closing the resin passage, it has been controlled such that the tip portion of the shut-off pin does not project into the cavity, namely, such that the pin simply exists within the sprue when blocking the resin passage. By contrast, in the present invention, the shut-off pin (5) is controlled such that the tip portion thereof can project into the cavity and such that, in the state where the resin passage (7) is blocked by the pin (5), the tip of the pin (5) can stop at a plurality of different positions (projecting positions (5c, 5d) and closing position (5b)).

A typical example of such control is a two-step control operation comprising, for instance, a first step in which the shut-off pin (5) is moved from within the resin passage (7) into the sprue (12) such that the tip portion of the pin (5) stops at a given position within the sprue (12) below the cavity face (3a) and a second step in which the shut-off pin (5) further advances into the sprue (12) such that the tip of the pin (5) projects into the cavity and stops at a position separated from the cavity face (3a) by a predetermined distance. Of course, the stop position of the tip of the shut-off pin (5) may be controlled not only in the above-mentioned two steps but also in three or more steps depending on the aimed multilayer molded article, molding condition, and the like.

Since the advancing or retracting movement of the shut-off pin (5) is stopped at a predetermined plurality of positions in such control of the shut-off pin (5), no specific means is necessary therefor, and typical electric or mechanical means may be used. As such means is used in combination with the above-mentioned moving means for advancing or retracting the shut-off pin (5), it becomes easy to move the shut-off pin (5) and control its tip position.

Though a preferred embodiment of the mold assembly in accordance with the present invention is explained in detail in the foregoing, the mold assembly of the present invention should not be restricted thereto.

For example, the number and arrangement of the resin-supplying gate (4), which is a part of the resin passage (7) open to the cavity face (3a), is not restricted to that shown in FIG. 1, and a plurality of resin-supplying gates (4) may be disposed at suitable positions depending on the size, form, and the like of the aimed multilayer molded article.

Figure 3:
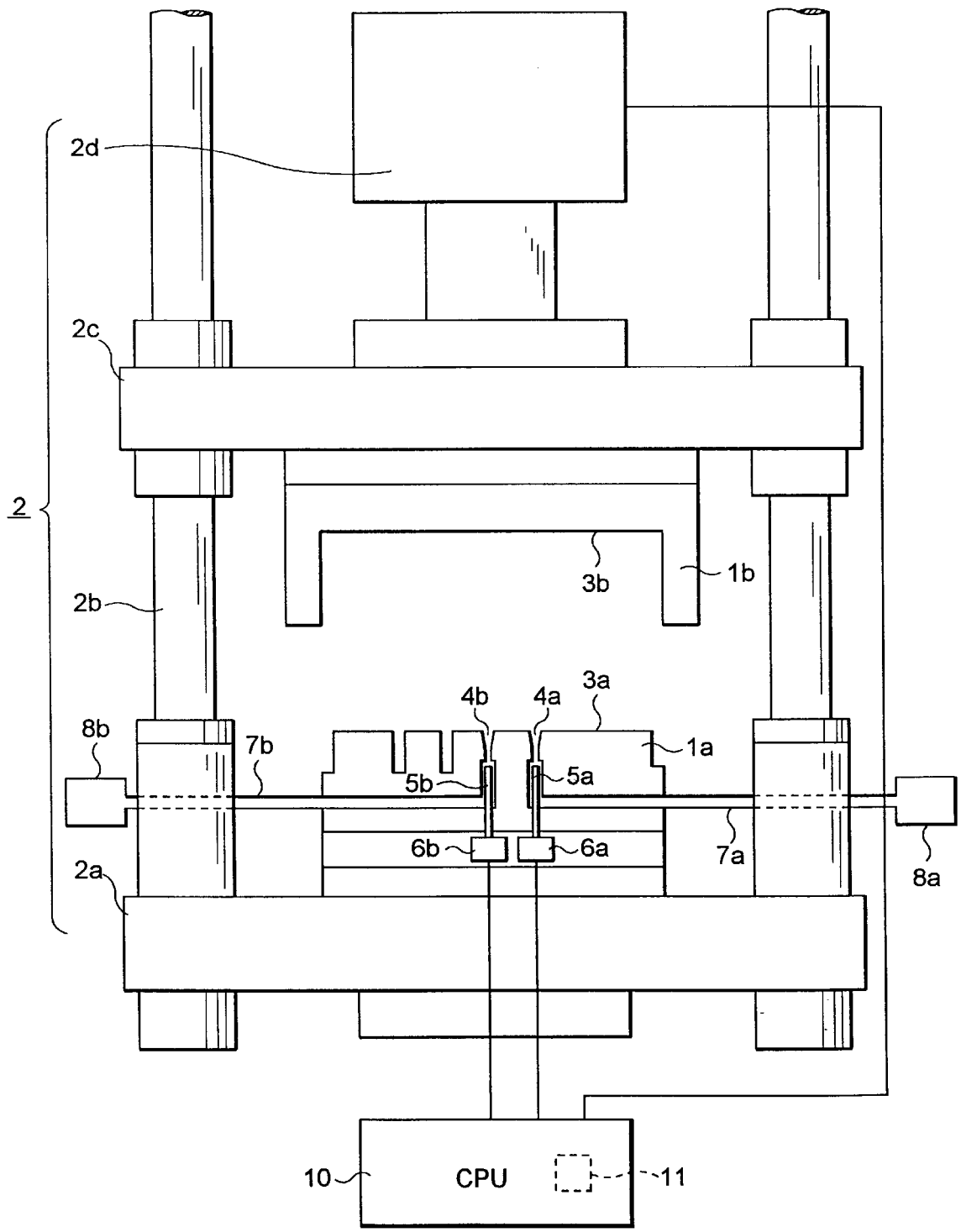
FIG. 3 is a schematic sectional view showing another embodiment of the mold assembly for making a multilayer molded article in accordance with the present invention.

Also, as shown in FIG. 3, discrete resin-supplying gates (4a, 4b) which can respectively supply first and second molten thermoplastic resins, independently of each other, into the cavity may be provided; whereas first and second resin-supplying units (8a, 8b) for supplying the first and second molten thermoplastic resins, independently of each other, may be connected to the resin-supplying gates (4a, 4b) through resin passages (7a, 7b), respectively. In this case, shut-off pins (5a, 5b) are respectively received in the resin-supplying gates (4a, 4b) and driven by pin-driving units (6a, 6b) independently of each other.

Figure 4:
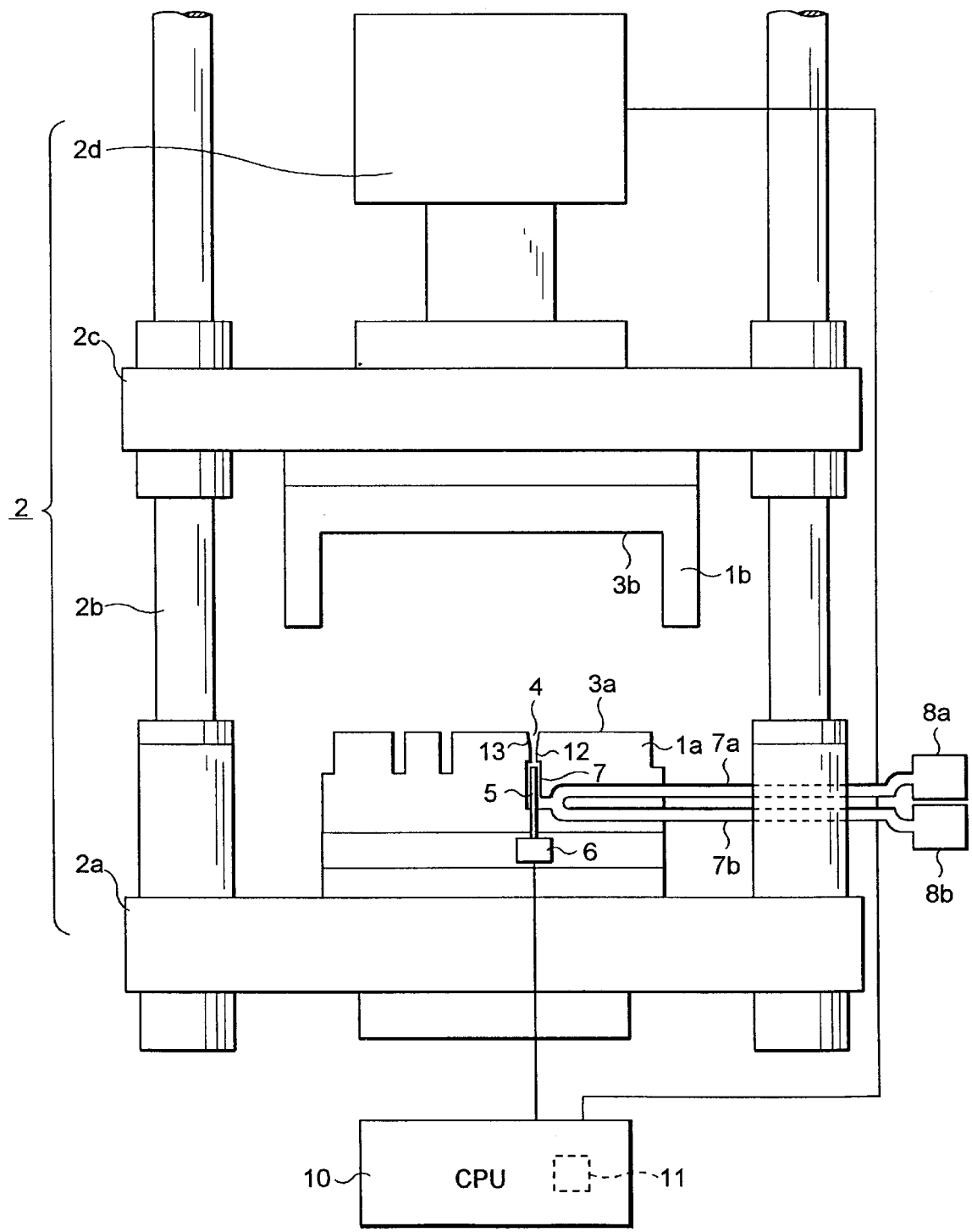
FIG. 4 is a schematic sectional view showing still another embodiment of the mold assembly for making a multilayer molded article in accordance with the present invention.

Alternatively, as shown in FIG. 4, a resin passage branching out into a plurality of resin passages (7a, 7b) on the midway may be used; whereas first and second resin-supplying units (8a, 8b) for supplying the first and second molten thermoplastic resins, independently of each other, may be connected to the resin passages (7a, 7b), respectively.

In the following, methods of the present invention for making a multilayer molded article by means of the above-mentioned mold assembly of the present invention, and control sequences in the control unit in the mold assembly of the present invention will be explained.

First, a method in which the mold assembly shown in FIGS. 1 and 2 is used for making a multilayer molded article shown in FIG. 6 in accordance with the timing chart shown in FIG. 5 will be explained. FIGS. 7A, 7B, 8A, 8B, 9A, 9B, 10A, 10B, 11A, and 11B are schematic sectional views showing their corresponding states of the mold assembly in manufacturing steps in the method of the present invention for making the multilayer molded article shown in FIG. 6 in accordance with the timing chart shown in FIG. 5 using the mold assembly shown in FIGS. 1 and 2.

Figure 6:
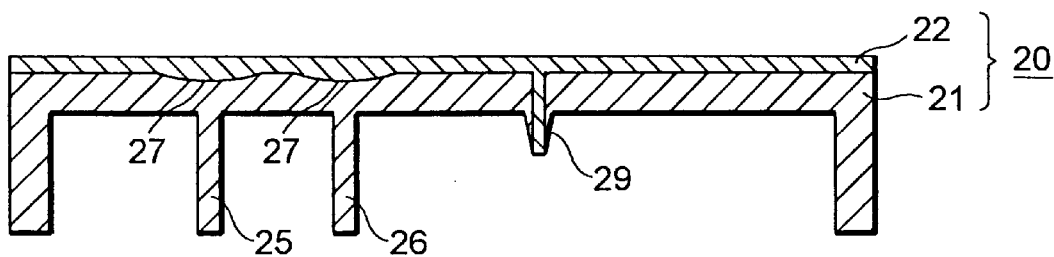
FIG. 6 is a sectional view showing an embodiment of a multilayer molded article having protrusions manufactured by the method of the present invention using the mold assembly of the present invention.

FIG. 6 is a sectional view showing an example of a multilayer molded article (20) obtained by the method of the present invention. This multilayer molded article (20) is constituted by a first molded layer (21) and a second molded layer (22), and its rear surface (exposed surface of the first molded layer (21)) has a rib (25) and a boss (26).

Figure 5:
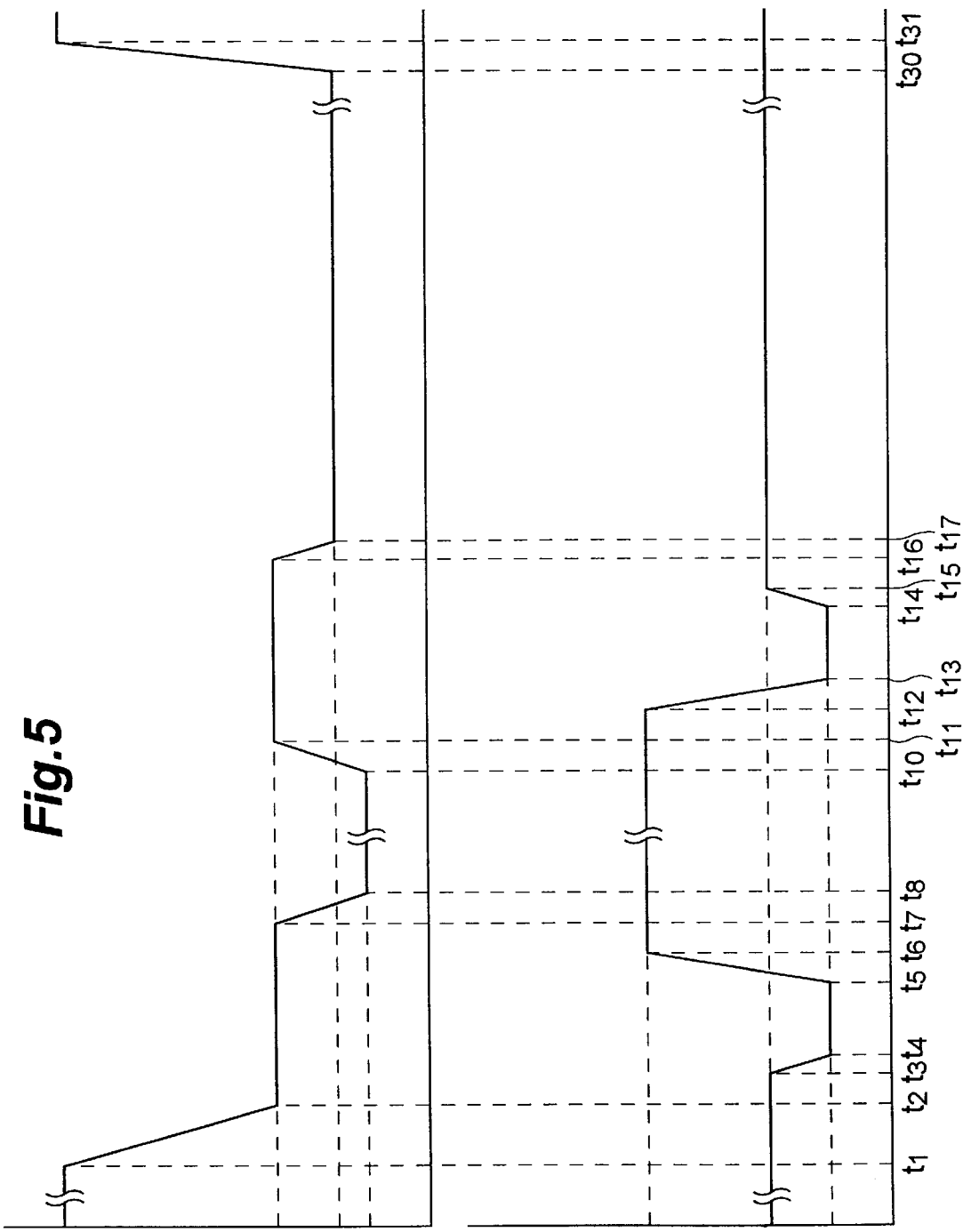
FIG. 5 is a timing chart showing operations of a second mold and shut-off pin in an embodiment of the method of making a multilayer molded article in accordance with the present invention.
Figure 7A:
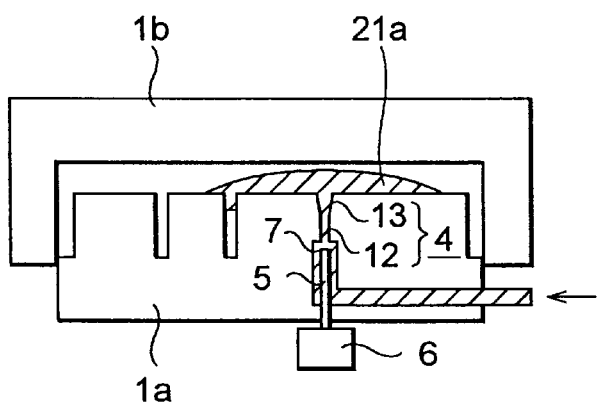
FIGS. 7A, 8A, 9A, 10A, and 11A are schematic sectional views showing respective states of the mold assembly in manufacturing steps in the method of the present invention for making a multilayer molded article in accordance with the timing chart shown in FIG. 5 using the mold assembly shown in FIG. 1.

As shown in FIG. 5, first, the control unit (10) drives the driving unit (2d) so as to move down the second mold (1b) from the first open position to the second open position shown in FIG. 7A ($t_1$ to $t_2$).

Figure 7B:
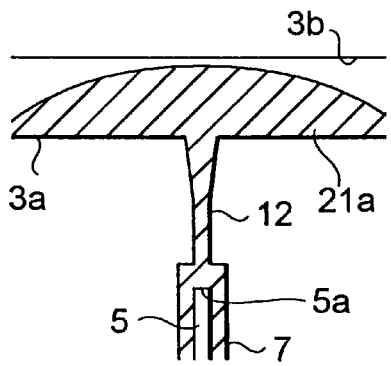
FIGS. 7B, 8B, 9B, 10B, and 11B are schematic sectional views showing the states of the mold assembly shown in FIGS. 7A, 8A, 9A, 10A, and 11A near its resin-supplying gate, respectively.

Then, the control unit (10) drives the pin-driving unit (6) so as to move the pin (5) to the opening position (5a) so that the tip position of the shut-off pin (5) is within the resin passage (7) and so that the sprue (12) is not blocked by the pin (5), thereby bringing the resin-supplying gate (4) into the opening state ($t_3$ to $t_4$). In this opening state, by way of the resin-supplying gate (4), a first amount of molten thermoplastic resin (21a) necessary for forming the first molded layer (21) is supplied into the cavity (FIGS. 7A and 7B).

Here, the distance (gap) between the tip position of the shut-off pin (5) and the rear end portion of the sprue (12) may be adjusted so as to control the passage area of the molten resin.

Figure 8A:
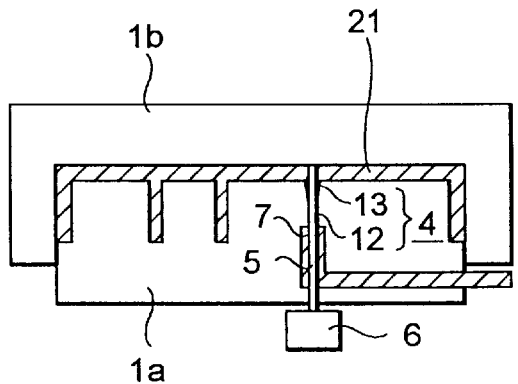
Figure 8B:
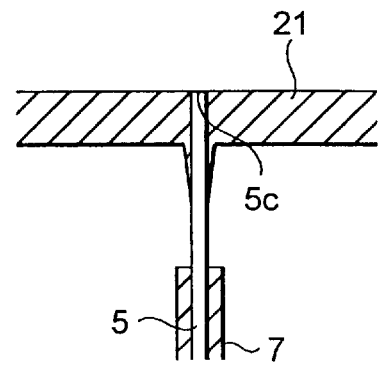

After the molten resin is supplied, the control unit (10) drives the pin-driving unit (6) so as to advance the shut-off pin (5) to the projecting position (5c) at which the tip position of the shut-off pin (5) is above the cavity face (3a) while the length of thus projected portion is not greater than the thickness of the first molded layer (21) after the shaping thereof, thereby blocking the sprue (12) so as to bring the resin-supplying gate (4) into the closing state ($t_5$ to $t_6$). Then, the control unit (10) drives the driving unit (2d) such that the molds (1a, 1b) are closed ($t_7$ to $t_8$). As the molds are cooled while being pressed, the first molded layer (21) is obtained (FIGS. 8A and 8B).

Here, the tip of the shut-off pin (5) can be placed at any position as long as it is above the cavity face (3a) while the length of thus projected portion is not greater than the thickness of the first molded layer (21) after the shaping thereof. In general, however, it is preferably placed at a position substantially corresponding to the above-mentioned thickness or slightly therebelow.

As shown in FIG. 12, the above-mentioned closing operation ($t_7$ to $t_8$) may also be started, as long as it is after the sprue (12) is blocked by the shut-off pin (5) so as to close the resin-supplying gate (4), during the time ($t_5$ to $t_6$) in which the tip portion of the shut-off pin (5) is moved till it reaches the projecting position (5c). In this case, the pin (5) is moved before the above-mentioned closing operation is completed.

Figure 9A:
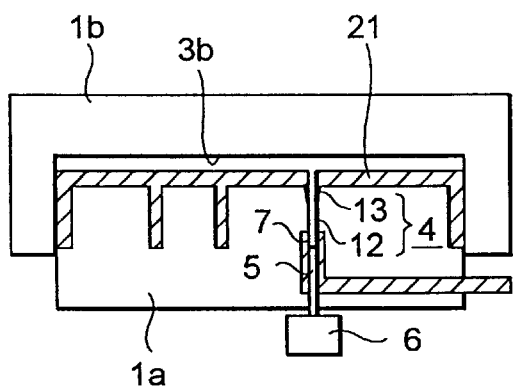
Figure 9B:
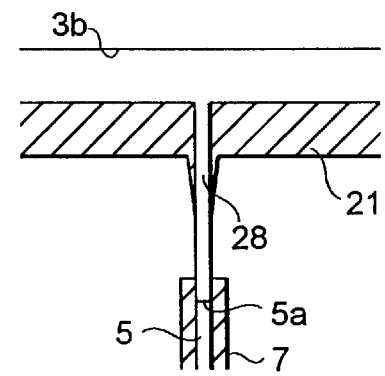

After the first molded layer (21) is completely shaped, the control unit (10) drives the driving unit (2d) such that, without the first molded layer (21) being released from the cavity face (3a), the molds (1a, 1b) are brought into the second open state ($t_{10}$ to $t_{11}$). Then ($t_{12}$ to $t_{13}$), the control unit (10) drives the pin-driving unit (6) such that the shut-off pin (5) is retracted to the opening position (5a). In this manner, as shown in FIGS. 9A and 9B, a hole (28: resin passage) is formed within the first molded layer (21), and the resin-supplying gate (4) is brought into the opening state.

Here, as shown in FIG. 12, the operation ($t_{12}$ to $t_{13}$) for retracting the shut-off pin (5) may also be effected while the above-mentioned opening operation ($t_{10}$ to $t_{11}$) is being performed.

Thus, when the molds are mechanically brought into the open state so that they have a predetermined cavity clearance therebetween without the first molded layer (21) being released from the cavity face (3a), a clearance is formed between the surface of the first molded layer (21) and its opposing cavity face (3b). Also, when the shut-off pin (5) is retracted, the hole (28) is formed as the trace of the retracted pin in the first molded layer (21).

Here, the hole (28) in the first molded layer (21), which is the trace of the retracted pin, may not necessarily be a complete passage whose wall face is completely solidified. According to circumstances, the moten resin in an unsolidified state may exist in the hole (28) as long as the hole (28) can attain such a state that, in a step of supplying a resin thereafter, the moten resin can pass therethrough by its supplied pressure. Similarly, depending on the initially set tip position of the shut-off pin (5), the hole (28) may not penetrate through the first molded layer (21), as long as it can attain such a state that the unpenetrated portion is broken by the supplied pressure of the molten resin provided thereafter, thereby allowing the molten resin to pass through the hole (28).

Figure 10A:
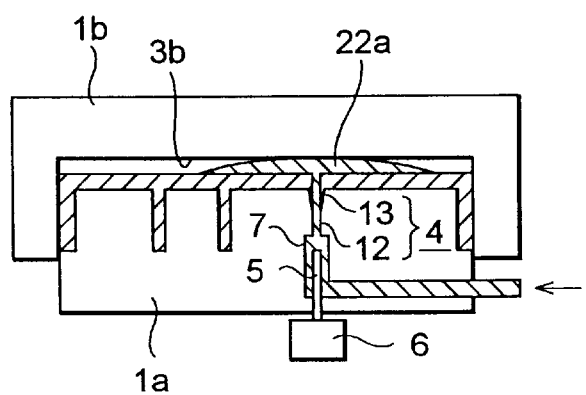
Figure 10B:
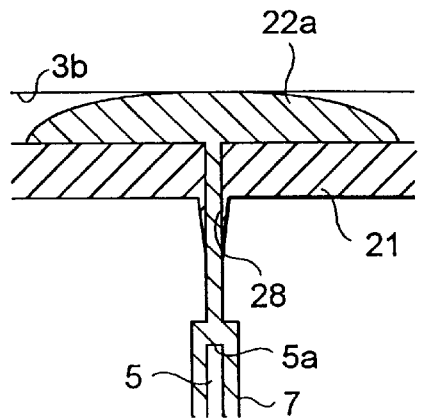
Figure 11A:
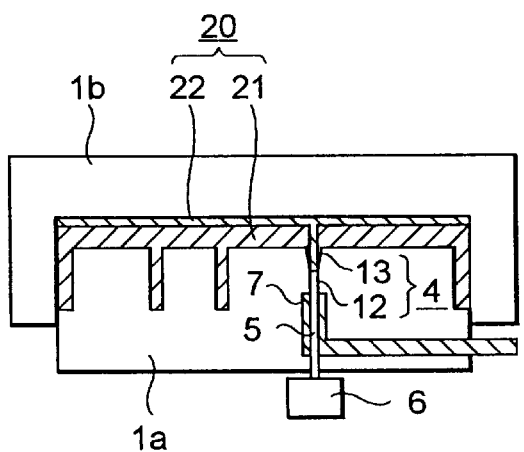
Figure 11B:
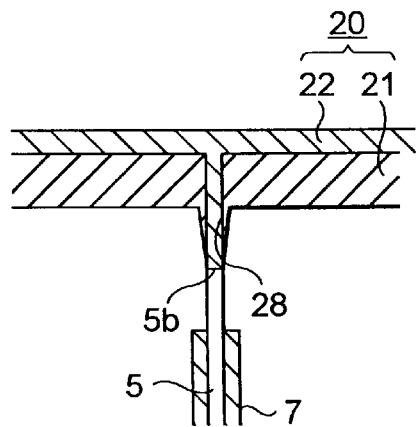

In such a state, when a second amount of molten thermoplastic resin (22a) necessary for forming the second molded layer (22) is supplied from the resin passage (7), the molten resin is supplied, by way of the resin-supplying gate (4) and the hole (28), between the first molded layer (21) and the cavity face (3b) of the second mold (FIGS. 10A and 10B).

After the molten resin is thus supplied again, the control unit (10) drives the pin-driving unit (6) such that the shut-off pin (5) advances to the closing position (5b) in the sprue (12), thereby bringing the resin-supplying gate (4) into the closing state ($t_{14}$ to $t_{15}$). Then, the control unit (10) drives the driving unit (2d) such that the molds (1a, 1b) are closed ($t_{16}$ to $t_{17}$). After being cooled while being pressed (FIGS. 11A and 11B), the molds (1a, 1b) are brought into the first open state ($t_{30}$ to $t_{31}$), thus allowing the multilayer molded article (20) shown in FIG. 6 to be removed therefrom.

Preferably, the advancing movement ($t_{14}$ to $t_{15}$) of the shut-off pin (5) is started at the same time when the supply of resin is completed. Also, as shown in FIG. 12, the closing operation ($t_{16}$ to $t_{17}$) of the molds may be effected at the same time when the advancing movement ($t_{24}$ to $t_{15}$) of the shut-off pin (5) is completed.

Preferably, the resin-supplying gate (4) is closed such that the tip position of the shut-off pin (5) is not placed above the cavity face (3a), namely, such that the tip position does not reach the first molded layer (21).

Figure 13:
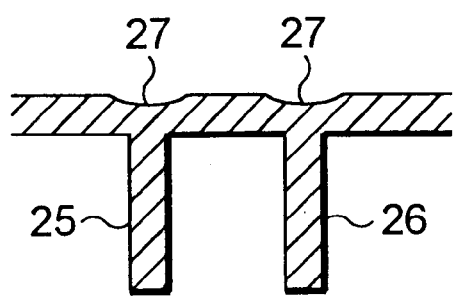
FIG. 13 is a partially sectional view showing a molded article (first molded layer) having protrusions manufactured by a first molding step.

FIG. 13 shows an enlarged section of a protruded portion of the first molded layer (21) obtained by the first resin supply in such a method, whereas FIG. 6 shows a section of the multilayer molded article (20) obtained after the second resin supply. In the first molded layer (21) obtained by the first molding step, as shown in FIG. 13, on the surface (front surface) opposite to the rear surface where protrusions such as rib (25) and boss (26) are attached, sinks (27) may occur at positions corresponding to these protrusions. In the method of the present invention, however, the resin is supplied again onto the first molded layer (21) so as to form the second molded layer (22) on the front surface thereof. Accordingly, the portion of the first molded layer (21) having the sinks (27) is covered with the second molded layer (22), thereby producing a multilayer molded article having a smooth front surface and a favorable appearance such as that shown in FIG. 6.

Also, in the method of the present invention, the molten thermoplastic resin (22a) for forming the second molded layer (22) is supplied through the hole (28) in the first molded layer (21). Consequently, the irregularities (29) caused by the resin supply appear only on the rear surface (exposed surface of the first molded layer (21)) of the multilayer molded article (20) and not on the front surface (exposed surface of the second molded layer (22)) thereof. Accordingly, as shown in FIG. 6, the multilayer molded article (20) manufactured by the method of the present invention attains a favorable appearance without any irregularities caused by the resin supply.

Though preferred embodiments of the method of making a multilayer molded article in accordance with the present invention are explained in detail in the foregoing, the method of the present invention should not be restricted thereto.

Figure 14:
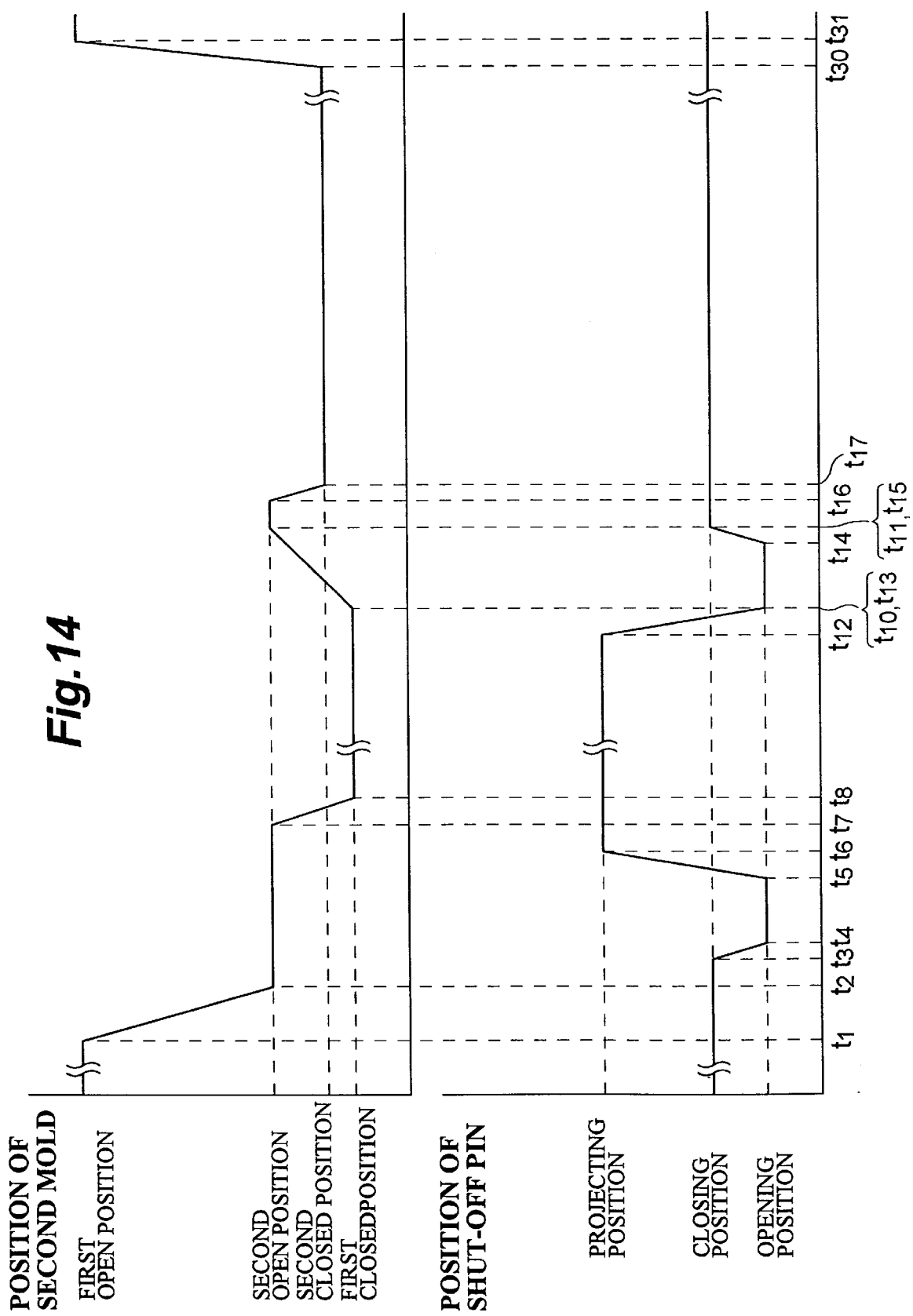
FIG. 14 is a timing chart showing operations of the second mold and shut-off pin in still another embodiment of the method of making a multilayer molded article in accordance with the present invention.

For example, as shown in FIG. 14, after the first molded layer (21) is shaped, while or after the closing pressure applied between the first and second molds is substantially shifted to a no-load state as the pressure for closing the molds (1a, 1b) is relieved without the first molded layer (21) being released from the cavity face (3a), the shut-off pin (5) may be retracted to the opening state (5a) ($t_{12}$ to $t_{13}$), whereby the hole (28) is formed in the first molded layer (21) while the resin-supplying gate (4) is brought into the opening state, thus allowing the second molten thermoplastic resin to be supplied from the resin passage (7) by way of the resin-supplying gate (4) and the hole (28).

In this case, as shown in FIG. 14, the cavity face (3b) of the second mold opposing the surface of the first molded layer (21) retracts due to the supplied pressure of the molten resin ($t_{10}$ to $t_{11}$), whereby the moten resin is supplied between thus retracted cavity face (3b) of the second mold and the front surface of the first molded layer (21). Thereafter, as mentioned above, in the state where the shut-off pin (5) is advanced into the sprue (12) so as to close the resin-supplying gate (4), the molds are closed and then cooled while being pressed, whereby a multilayer molded article such as that shown in FIG. 6 is obtained.

Figure 15:
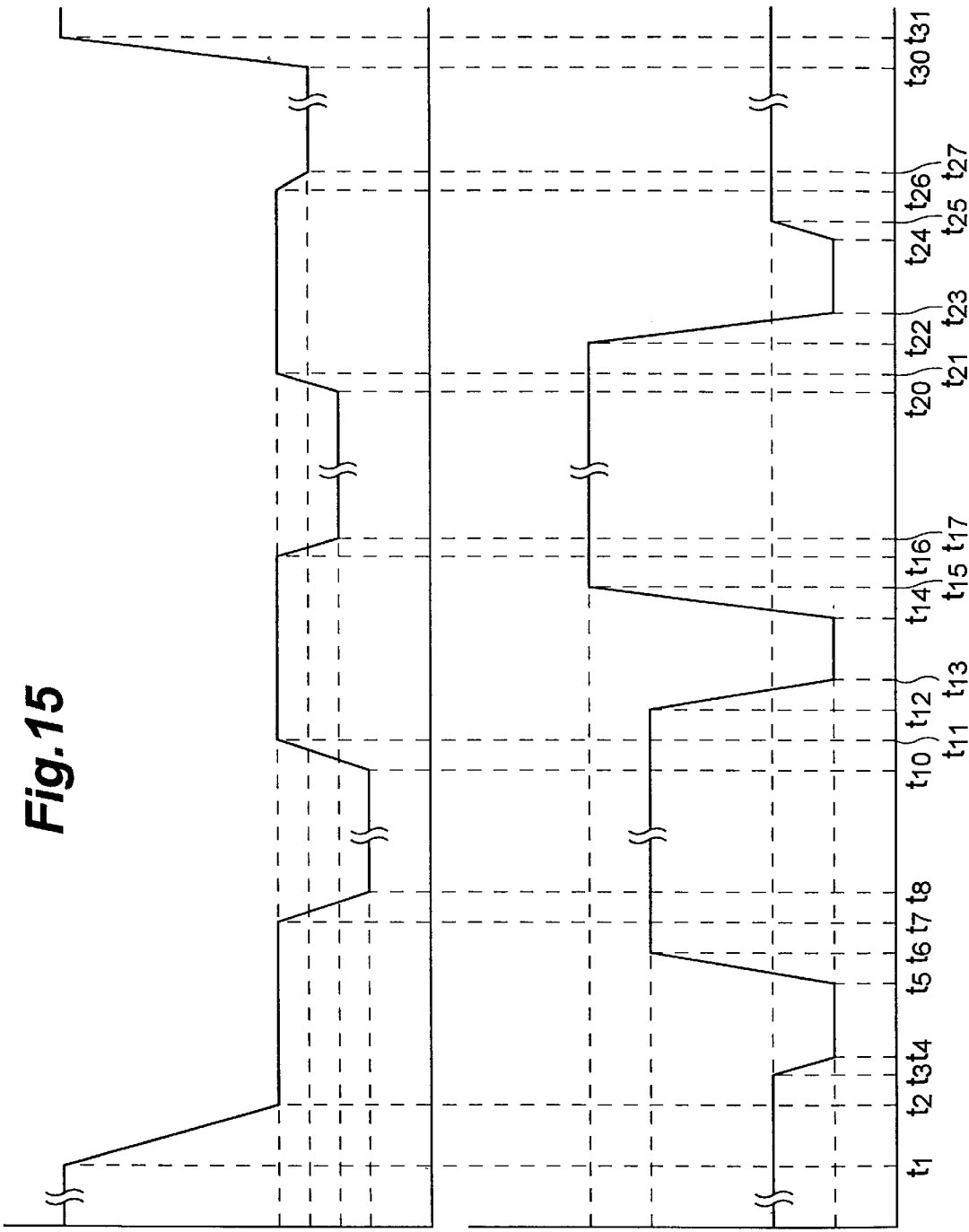
FIG. 15 is a timing chart showing operations of the second mold and shut-off pin in a further embodiment of the method of making a multilayer molded article in accordance with the present invention.
Figure 16:
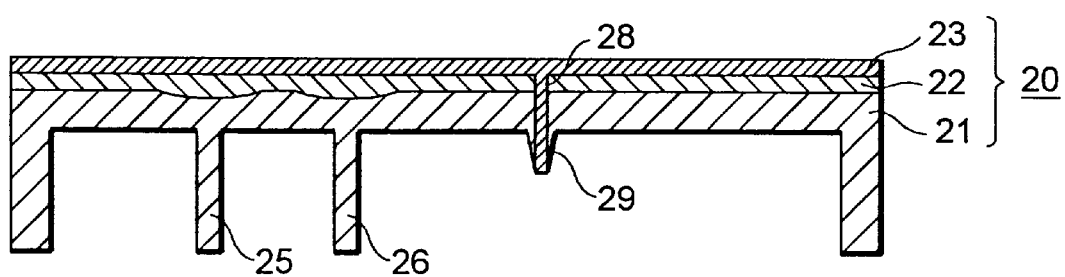
FIG. 16 is a sectional view showing another embodiment of the multilayer molded article having protrusions manufactured by the method of the present invention using the mold assembly of the present invention.

Also, as shown in FIG. 15, when a molten thermoplastic resin is further repeatedly supplied and subjected to closing and shaping operations in a suitable manner similar to the above-mentioned method after the first molten thermoplastic resin is supplied and subjected to closing and shaping operations, a multilayer molded article having three or more molded layers such as that shown in FIG. 16 can be obtained.

Namely, after the second amount of molten thermoplastic resin (22a) necessary for forming the second molded layer (22) is supplied between the first molded layer (21) and the cavity face (3b) of the second mold by way of the resin-supplying gate (4) and the hole (28) in the above-mentioned method, as shown in FIG. 15, the shut-off pin (5) is moved to the projecting position (5d) ($t_{14}$ to $t_{15}$), and then the molds are closed ($t_{16}$ to $t_{17}$) so as to yield the second molded layer (22). Thereafter, the molds are brought into the second open state ($t_{20}$ to $t_{21}$), and the shut-off pin (5) is moved to the opening position (5a) ($t_{22}$ to $t_{23}$), whereby a third amount of molten thermoplastic resin necessary for forming a third molded layer (23) is supplied between the second molded layer (22) and the cavity face (3b) of the second mold by way of the resin-supplying gate (4) and the hole (28). Subsequently, as mentioned above, in the state where the shut-off pin (5) is advanced into the sprue (12) so as to close the resin-supplying gate (4), the molds are closed and then cooled while being pressed, whereby a multilayer molded article such as that shown in FIG. 16 is obtained. In this case, the tip position of the shut-off pin (5) is controlled in a plurality of steps so as to correspond to the number of resin layers in the aimed multilayer molded article.

In the method of the present invention, a multilayer molded article comprising two or more kinds of different resin layers (molded layers) can be obtained by means of a mold assembly such as that shown in FIG. 3 having discrete resin passages (7a, 7b) such that a plurality of thermoplastic resins can respectively be supplied, independently of each other, into the cavity or a mold assembly such as that shown in FIG. 4 having the resin passage (7) into which the resin passages (7a, 7b) corresponding to the respective thermoplastic resins finally merge. Namely, the first molten thermoplastic resin (21a) is supplied between the cavity face (3a) of the first mold (1a) and the cavity face (3b) of the second mold (1b) by way of the resin-supplying gate (4) in the first resin-supplying step in the above-mentioned method, and the second molten thermoplastic resin (22a) is supplied between the first molded layer (21) and the cavity face (3b) of the second mold (1b) by way of the resin-supplying gate (4) and the hole (28) in the first molded layer in the subsequent resin-supplying step, whereby a multilayer molded article having molded layers respectively made of different kinds of resins are obtained. When the thermoplastic resin forming the front layer portion is thus selected without being restricted by the thermoplastic resin forming the rear layer portion, the design of the multilayer molded article can easily be changed. Also, it becomes easy to provide the molded article with a vibration-isolating property or its surface with a soft feel.

As the thermoplastic resin employed in the method of the present invention, various kinds of thermoplastic resins conventionally used in molding techniques such as injection molding, compression molding, and injection compression molding can be used as they are. They can be exemplified by various kinds of thermoplastic resins including polyolefin resins such as polyethylene resins and polypropylene resins; vinyl chloride resins; acrylic resins; polycarbonate resin; acrylonitrile/styrene resin; acrylonitrile/butadiene/styrene resin; and polystyrene resin. Also, various kinds of thermoplastic elastomers, various kinds of thermoplastic resin mixtures, polymer alloys, and the like can similarly be used. The thermoplastic resin in the present invention is used as a general term referring to these materials. of course, various kinds of stabilizers, pigments, and the like generally in use may optionally be compounded in such a thermoplastic resin. Also, it may contain various kinds of fillers such as talc and clay as well as reinforcement fibers such as glass fiber.

As explained in the foregoing, when a multilayer molded article is manufactured by the method of the present invention using the mold assembly of the present invention, a multilayer molded article can be made easily and efficiently in a series of steps without any restriction in terms of material and form, with a favorable appearance having no sinks generated on a surface of its base material opposite to a part where a protrusion such as rib or boss is attached.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 220069/1996 filed on Aug. 21, 1996 is hereby incorporated by reference.

What is claimed is:

1. A mold assembly for making a multilayer molded article of a thermoplastic resin comprising:
   a first mold having a cavity face, a resin-supplying gate open to said cavity-face, and a resin passage communicating with said resin-supplying gate;
   a second mold having a cavity face opposing the cavity face of said first mold;
   a shut-off pin slidably received in said resin-supplying gate;
   a pin-driving unit for moving said shut-off pin among an opening position where said shut-off pin is completely received in said first mold while said resin-supplying gate is maintained in an opening state, a closing position where said shut-off pin is completely received in said first mold while said resin-supplying gate is maintained in a closing state, and a projecting position where a part of said shut-off pin projects from the cavity face of said first mold while said resin-supplying gate is maintained in the closing state;
   a resin-supplying unit for plurally supplying, in a process cycle, a molten thermoplastic resin from said resin-supplying gate by way of said resin passage;
   a press unit, connected to said first and second molds, for moving at least one of said molds between an open position where said first and second molds are in an open state and a closed position where said molds are in a closed state; and
   a control unit electrically connected to said pin-driving unit and said press unit so as to plurally supply in a process cycle a molten thermoplastic resin in control of moving said shut-off pin and said press unit.

2. A mold assembly according to claim 1, wherein said pin-driving unit can move said shut-off pin among said opening position, said closing position, and a plurality of projecting positions in which the projecting part of said shut-off pin projected from the cavity face of said first mold has respective lengths different from each other.

3. A mold assembly according to claim 1, wherein said control unit further controls said pin driving unit and said press unit such that:
   (a) while said resin-supplying gate is brought into the opening state by means of said shut-off pin, a molten thermoplastic resin is supplied, by way of said resin-supplying gate, between the cavity faces of said first and second molds that are in the open state;
   (b) while said resin-supplying gate is brought into the closing state by means of said shut-off pin, a part of said shut-off pin is projected from the cavity face of said first mold;
   (c) said first and second molds are closed as to attain the closed state, thereby shaping said resin, and thus shaped resin is cooled so as to be solidified;

(d) said first and second molds are opened so as to attain the open state;

(e) said shut-off pin is returned into said first mold, so as to form a hole in the resin solidified in said (c) and bring said resin-supplying gate into the opening state, and a molten thermoplastic resin is supplied between the resin solidified in said (c) and the cavity face of said second mold by way of said resin-supplying gate and said hole;

(f) said resin-supplying gate is brought into the closing state by means of said shut-off pin;

(g) said first and second molds are closed so as to attain the closed state, thereby shaping said resin, and thus shaped resin is cooled so as to be solidified; and (h) said first and second molds are opened.

4. A mold assembly according to claim 3, wherein said control unit controls said pin-driving unit and said press unit such that said (b) to (e) are repeated a plurality of times.

5. A mold assembly according to claim 3, wherein said control unit controls said pin-driving unit and said press unit such that the projecting part of said shut-off pin projected from the cavity face of said first mold in said (b) has a length not greater than a cavity clearance between the cavity faces of said first and second molds brought into the closed state in said (c).

6. A mold assembly according to claim 3, wherein said control unit controls said pin-driving unit and said press unit such that, while an operation for projecting said shut-off pin in said (b) is being performed, an operation for closing said first and second molds in said (c) is carried out.

7. A mold assembly according to claim 3, wherein said control unit controls said pin-driving unit and said press unit such that, while an operation for opening said first and second molds in said (d) is being performed, an operation for returning said shutoff pin into said first mold in said (e) is carried out.

8. A mold assembly according to claim 3, wherein said control unit controls said pin-driving unit and said press unit such that an operation for returning said shut-off pin into said first mold in said (e) is effected prior to said (d), and an operation for opening said first and second molds in said (d) is brought about by a pressure of the molten thermoplastic resin supplied between the resin solidified in said (c) and the cavity face of said second mold.

9. A mold assembly according to claim 8, wherein said control unit controls said pin-driving unit and said press unit such that an operation for returning said shut-off pin into said first mold in said (e) is effected while or after a closing pressure applied between said first and second molds is substantially shifted to zero.

10. A mold assembly according to claim 3, wherein said control unit controls said pin-driving unit such that said shut-off pin keeping said resin-supplying gate in the closing state is completely received in said first mold in said (f).

11. A mold assembly according to claim 3, wherein said open state includes a first open state wherein said first and second molds are arranged with a cavity clearance therebetween such that said molded article can be removed from between said molds, and a second open state wherein the cavity clearance is smaller than that in said first open state; and wherein said control unit controls said pin-driving unit and said press unit such that an operation for supplying the molten thermoplastic resin in said (a) is effected after said first and second molds are shifted from said first open state to said second open state.

12. A mold assembly according to claim 3, wherein said multilayer molded article includes first and second molded layers; and wherein said control unit controls said pin-driving unit such that:

in said (a), a first amount of molten thermoplastic resin necessary for forming said first molded layer is supplied between the cavity faces of said first and second molds by way of said resin-supplying gate; and in said (e), a second amount of molten thermoplastic resin necessary for forming said second molded layer is supplied between said first molded layer and the cavity face of said second mold by way of said resin-supplying gate and the hole in said first molded layer.

13. A mold assembly according to claim 3, wherein said resin-supplying unit comprises a first resin-supplying unit for supplying a first molten thermoplastic resin and a second resin-supplying unit for supplying a second molten thermoplastic resin, said multilayer molded article including a first molded layer made of said first thermoplastic resin and a second molded layer made of said second thermoplastic resin; and wherein said control unit supplies:

in said (a), said first molten thermoplastic resin between the cavity faces of said first and second molds by way of said resin-supplying gate; and in said (e), said second molten thermoplastic resin between said first molded layer and the cavity face of said second mold by way of said resin-supplying gate and the hole in said first molded layer.

\* \* \* \* \*